June 16, 1931.  J. R. SHEA  1,810,227
DRIVE FOR SCREW MACHINES AND THE LIKE
Filed Dec. 28, 1928   2 Sheets-Sheet 1
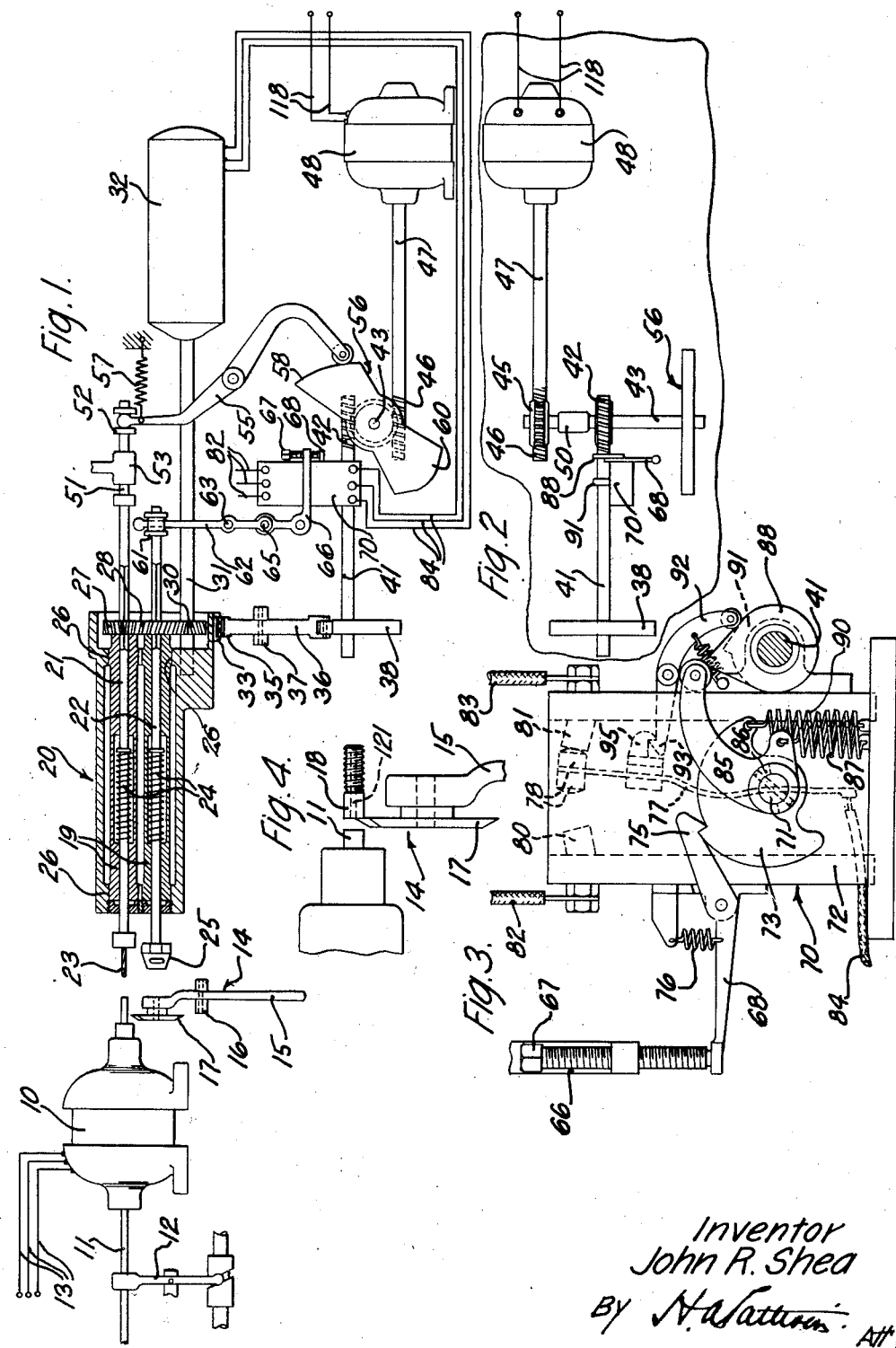
Inventor
John R. Shea
By N. A. Vattern Att'y.

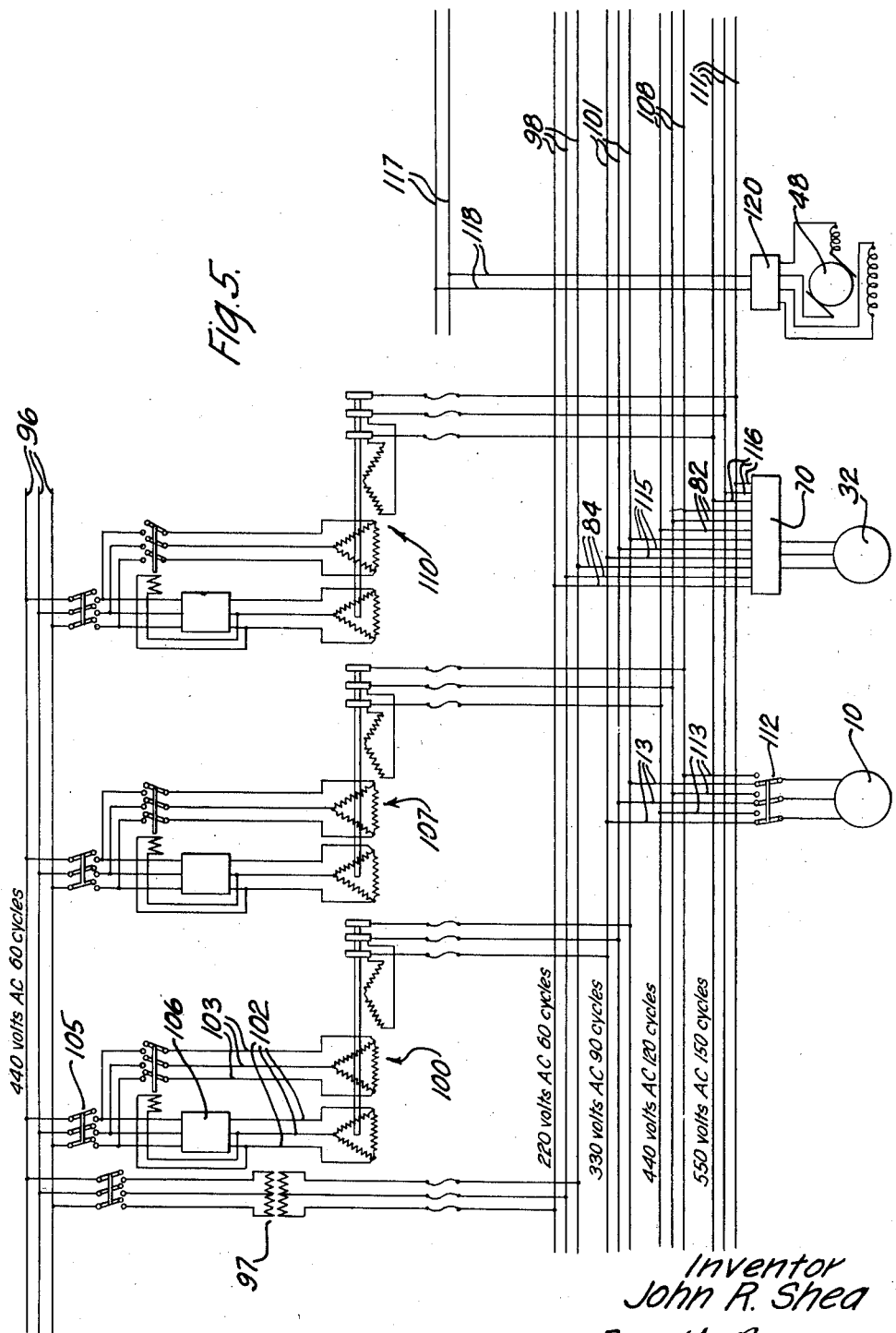

Patented June 16, 1931

1,810,227

UNITED STATES PATENT OFFICE

JOHN RICHARD SHEA, OF RIVER FOREST, ILLINOIS, ASSIGNOR TO WESTERN ELECTRIC COMPANY, INCORPORATED, OF NEW YORK, N. Y., A CORPORATION OF NEW YORK

DRIVE FOR SCREW MACHINES AND THE LIKE

Application filed December 28, 1928. Serial No. 329,032.

This invention relates to a drive for screw machines and the like, and more particularly to an electric driving mechanism for machines used in the manufacture of small parts such as screws.

The principal objects of the invention are to simplify the construction of screw machines and the like, to improve the operation and increase the output of such machines, and to provide instantaneous and accurate speed control thereof.

In one embodiment of the invention, an automatic screw machine is provided with an induction motor for rotating the work at a constant speed, and a second induction motor is arranged to rotate a threading tool in the same direction but at a higher speed than the first motor to thereby form threads on the work. The second motor is connected to a source of alternating current of a certain frequency during the threading operation, but when this operation is completed the second motor is automatically connected to a source of alternating current of a lower frequency whereupon it rotates the threading tool at a lower speed than the work, causing a relatively reverse motion between the work and the tool to unthread the tool from the work. Simultaneously, a motion of translation is imparted to the tool to withdraw it from the work.

The invention will be more fully understood from the following description, taken in connection with the appended drawings, in which Fig. 1 is a diagrammatic elevation of a screw machine embodying the invention;

Fig. 2 is a plan view of a part of the mechanism shown in Fig. 1;

Fig. 3 is an enlarged detail view of the control switch and its actuating mechanism;

Fig. 4 is an enlarged detail view of the cutting mechanism, and

Fig. 5 is a diagram of the electrical apparatus.

In the embodiment illustrated in the drawings, an induction motor 10 (Fig. 1) is arranged to rotate the work in a well known manner, the work being a rod of stock 11 which passes axially through a central opening in the motor 10. Suitable advancing means 12 of any known construction is provided to intermittently advance the work. Motor 10 is connected, by leads 13, to a source of alternating current of such frequency as to rotate it at a constant predetermined speed which for simplicity of explanation will be taken as 5400 R. P. M. A cutting mechanism 14 of known construction is mounted adjacent the motor 10 and comprises a lever 15 pivoted at 16 and carrying a tool 17 which when the lever 15 is turned upon its pivot and the work 11 is rotated, separates the completed screw 18 in the manner shown in Fig. 4.

A turret 20 is mounted in operative relation to motor 10 and comprises reciprocable spindles 21 and 22 splined to sleeves 19 and carrying respectively a drill 23 and a threading die 25, the spindles being yieldingly urged rearwardly by spiral compression springs 24 mounted within the sleeves. The sleeves are journaled in bearings 26, and a pair of interengaging gears 27 and 28 are keyed to the sleeves at their rear ends, gear 28 being in engagement with a driving gear 30 fixed to the shaft 31 of a tool driving motor 32, which is a high speed motor having a low radius of gyration to facilitate quick changes in speed. Turret 20 is oscillated about shaft 31 as a pivot in the usual manner by means of a segmental gear 33 fixed to the turret and engaging a second segmental gear 35 which is fixed to an oscillating lever 36 pivoted at 37 and arranged to be actuated by an indexing cam 38.

Cam 38 is mounted on a cam shaft 41 which, by means of a worm gearing 42, is connected to a transverse shaft 43 carrying a gear 45 (Fig. 2) which engages a worm 46 on the shaft 47 of an indexing motor 48. A clutch 50 is interposed between gears 45 and 42 to discontinue the operation of the cam shaft when desired.

A tool advancing spindle 51 (Fig. 1) is mounted in alignment with the work 11 and carries at its forward end a head for engaging spindle 21 and at its rear end a collar 52 whereby it may be slidably advanced through its support 53. A pivoted cam lever 55 has one of its ends engaging collar 52 and its other end engaging a feed cam 56, against which it is yieldingly pressed by a tension spring 57. The cam has two segmental faces 58 and 60, face 58 providing for a steady advancement of spindle 21 followed by a quick release, while face 60 is shaped to provide for a gradual advancement of spindle 22 followed by a retraction of the spindle at the same rate of speed.

Spindle 22 carries a grooved collar 61 which is arranged to engage and actuate lever 62 when the spindle is indexed into its operative position. Lever 62 is pivoted at 63 and has a pivotal connection, at 65, with a bell-crank lever 66. Lever 66 connects, by means of an adjusting screw 67, with a pivoted trip lever 68 which forms part of the switch mechanism 70, shown in detail in Fig. 3, and which will now be described.

A countershaft 71 is journaled in the frame 72 of the switch mechanism and carries a ratchet 73 fixed thereto and adapted to engage a detent 75 formed on the inner end of lever 68, a spring 76 serving to yieldingly hold the two in engagement. A flat spring 77 passes through and is fixedly secured to countershaft 71, and at its upper end carries contacts 78 which are designed to contact alternately with fixed contacts 80 and 81 connected respectively to leads 82 and 83. At its lower end spring 77 is connected to leads 84 which extend to motor 32.

A cam lever 85 is mounted on shaft 71 in such a manner as to have a small angle of play or lost motion, as indicated at 86. A tension spring 87 yieldingly holds the lever in contact with a cam 88 on cam shaft 41, while a similar spring 90 urges ratchet 73 in the clockwise direction as viewed in Fig. 3. A second cam 91 is mounted on cam shaft 41 and is adapted to actuate a trip lever 92 which has a detent 93 adapted to engage a hooked member 95 fixed to spring 77.

In order to facilitate an understanding of the invention, the apparatus shown diagrammatically in Fig. 5 will be described with reference to certain definite values of voltage, frequency and speed, but it will be understood that these values and the values indicated on the drawing are to be construed in an illustrative rather than a limiting sense, as they may be varied widely according to the requirements of a particular situation. Conductors 96 are accordingly considered as supplying alternating current at 440 volts and at a frequency of 60 cycles per second, which current, by means of a transformer 97, is converted to alternating current at 220 volts and 60 cycles in buses 98.

Reference numeral 100 designates a frequency changer, preferably consisting of a motor-generator set, which has as its function the conversion of the current in conductors 96 from 440 volts and 60 cycles to 330 volts and 90 cycles in buses 101. The frequency changer is connected to conductors 96 by leads 102 and 103, in which are interposed a switch 105 and a starting compensator 106 of usual construction.

A similar frequency changer 107 converts the current in conductors 96 from 440 volts and 60 cycles to 440 volts and 120 cycles in buses 108, and a third similar frequency changer 110 supplies current at 550 volts and 150 cycles to buses 111.

The motor 10, in the illustrated embodiment, is connected to buses 101 by leads 13 but may, in an alternative arrangement be switched to buses 108 by means of switch 112 and leads 113. The motor 32 in the illustrated embodiment is periodically switched from leads 84 and buses 98 to leads 82 and buses 108 by means of the switch mechanism 70 but may instead be connected through leads 115 or 116 to buses 101 or 111.

The indexing motor 48 is preferably supplied with direct current from mains 117 by means of leads 118, its speed being controlled by means of a rheostat 120.

The operation of the device is as follows. Assuming the parts to be in the position shown in Fig. 1, the motor 10 is supplied with alternating current at 90 cycles per second, causing it to rotate at 5400 R. P. M., and to rotate the work 11 at the same speed. The motor 48 is started and its speed regulated by means of the rheostat 120 (Fig. 5). The motor 32 is supplied with alternating current at 120 cycles, which causes it to rotate at 7200 R. P. M. in a direction opposite to that in which the motor 10 and the rod 11 are rotating. The clutch 50 is then engaged, and the cam 56 advances the spindle 21 until the drill 23 contacts with the rod 11, and the opposite movement between the drill and the rod 11 causes the former to drill a hole 121 (Fig. 4) lengthwise of the rod, the drill being then quickly retracted by spring 24. The turret 20 is then indexed by means of the cam 38 to bring the die 25, which is rotating in the same direction as motor 10, into alignment with the rod 11, and the face 60 of cam 56 operates to advance the die 25 over the rod while the differential between the speeds of motors 10 and 32 causes the die to cut threads on the outer surface of the rod at a speed of 1800 R. P. M.

During the operation thus far described, the contacts 78 and 80 (Fig. 3) are in engagement, but during the thread cutting operation the spindle 22 is moved forward by the tool-advancing spindle 51, while the collar 61 moves the lever 62 and the bell-crank lever 66 about their respective pivots, depressing the trip lever 68 until the detent 75 disengages the ratchet 73, whereupon the spring 90 quickly moves the ratchet and spring 77 in the clockwise direction until contacts 78 and 81 are engaged, causing alternating current at 60 cycles per second to be supplied to motor 32, whereupon its speed decreases from 7200 R. P. M. to 3600 R. P. M. which is lower than that of motor 10. Due to the resistance of the metal being cut and to the low radius of gyration of motor 32, its change in speed from 7200 to 3600 R. P. M. is almost instantaneous, it being found in practice that the length of the thread being cut may be controlled within one revolution of the die 25 relative to the work 11. This is of especial importance where the screw is provided with a head and it is desired to extend the threads over the entire length of the shank.

Since the tool 25 is then rotating in the same direction but at a lower speed than the work, the tool is in effect reversed and is unthreaded from the work, a translatory movement being imparted to it by the spring 24, aided by the cam action of the threads which have been cut. During this unthreading action the cam 88 is raising the lever 85, which places the spring 77 under tension, and when the unthreading operation is complete cam 91 trips the lever 92 which disengages the member 95 and allows the spring 77 to move contacts 78 into engagement with contacts 80 to again speed up motor 32 to 7200 R. P. M., the spring 77 being held in its new position by the engagement of detent 75 with ratchet 73. The finished screw 18 is then severed by cutting mechanism 14, the work advanced by mechanism 12, and the operation just described is repeated.

It will be understood that while the invention has been described with reference to the specific embodiment shown in the drawings, it may be applied with appropriate modifications to various types of machines, and is not limited except by the terms of the appended claims.

What is claimed is:

1. A drive mechanism for screw machines and the like, comprising means for rotating the work at a constant speed, means for advancing the tool relative to the work, a threading tool adapted to operate on the work, an electric motor adapted to rotate the tool, means supplying current to the motor to cause it to rotate the tool at a higher speed than the work, means supplying current to the motor to cause it to rotate the tool at a lower speed than the work, and a switch mechanism controlled by the operation of the advancing means rendering said two last mentioned means alternately inoperative.

2. A drive mechanism for screw machines and the like, comprising means for rotating the work in one direction, a tool, an induction motor, drive mechanism connecting the motor to the tool to drive it in the same direction as the work, and means for supplying said motor with alternating current at different frequencies to cause it to rotate the tool alternately at a higher and a lower speed than the work.

3. In a screw machine or the like, means for rotating the work in one direction at a predetermined speed, a rotary tool adapted to cut threads on the work, driving means for the tool including an induction motor, and means for alternately supplying to the motor electrical energy at different frequencies to cause the motor to rotate the tool alternately faster and slower than the work and in the same direction.

4. In a screw machine or the like, means for rotating the work in one direction at a predetermined speed, a threading tool adapted to operate on the work, means for advancing the tool relative to the work, means including an induction motor for rotating the tool in the same direction as the work during such advancement, and means controlled by the advancement of the work for alternately supplying to the motor electrical current at different frequencies to cause the motor to rotate the tool alternately faster and slower than the work.

5. In a screw machine or the like, means for rotating the work in one direction at a predetermined speed, a rotary forming tool adapted to operate on the work, means including an induction motor for driving the forming tool in a direction opposite to the direction of rotation of the work, a rotary threading tool adapted to cut threads on the work, a driving connection between the induction motor and the threading tool for driving the threading tool in the same direction as the work, means for successively indexing, advancing and retracting said tools relative to the work, and means for alternately supplying to the motor electrical current at different frequencies to cause the motor to rotate the threading tool alternately faster and slower than the work.

6. In a screw machine or the like, means for rotating the work in one direction at a predetermined speed, a rotary forming tool adapted to operate on the work, means including an induction motor for driving the tool in a direction opposite to the direction of rotation of the work, a rotary threading tool adapted to cut threads on the work, a driving connection between the motor and the threading tool for driving the threading tool in the same direction as the work, means for successively indexing, advancing and retracting said tools relative to the work, and means including a switch operative upon advancement of the threading tool to a predetermined position for alternately supplying to the motor electrical current at different frequencies to cause the motor to rotate the threading tool alternately faster and slower than the work.

7. In a screw machine or the like, means for rotating the work in one direction at a predetermined speed, a rotary tool adapted to cut threads on the work, driving means for the tool including an induction motor, said tool being adapted to be advanced relative to the work during the operation of said driving means, and means including a switch controlled by the advancement of the tool for alternately supplying to the motor electrical current at different frequencies to cause the motor to rotate the tool alternately faster and slower than the work and in the same direction.

In witness whereof, I hereunto subscribe my name this 13th day of December, A. D. 1928.

JOHN RICHARD SHEA.